United States Patent
Lakshminarayanan

(10) Patent No.: US 10,317,859 B2
(45) Date of Patent: Jun. 11, 2019

(54) PERSONAL MUSIC PLAYER

(71) Applicant: PAYPAL, INC., San Jose, CA (US)

(72) Inventor: Vijay Lakshminarayanan, Beaverton, OR (US)

(73) Assignee: PAYPAL, INC., San Jose, CA (US)

(*) Notice: Subject to any disclaimer, the term of this patent is extended or adjusted under 35 U.S.C. 154(b) by 749 days.

(21) Appl. No.: 14/283,723

(22) Filed: May 21, 2014

(65) Prior Publication Data

US 2015/0339096 A1    Nov. 26, 2015

(51) Int. Cl.
| | | |
|---|---|---|
| G06F 17/00 | (2019.01) | |
| G05B 15/02 | (2006.01) | |
| H04W 4/02 | (2018.01) | |
| G06F 16/635 | (2019.01) | |
| G06Q 30/00 | (2012.01) | |

(52) U.S. Cl.
CPC ........... *G05B 15/02* (2013.01); *G06F 16/635* (2019.01); *H04W 4/023* (2013.01); *G06Q 30/00* (2013.01)

(58) Field of Classification Search
CPC .. G05B 15/02; G06F 17/30761; G06Q 30/00; H04W 4/023
See application file for complete search history.

(56) References Cited

U.S. PATENT DOCUMENTS

| | | | |
|---|---|---|---|
| 2006/0089914 A1* | 4/2006 | Shiel | G06Q 30/00 705/52 |
| 2007/0156676 A1* | 7/2007 | Rosenberg | G06F 17/30035 |
| 2009/0234784 A1* | 9/2009 | Buriano | G06F 17/30035 706/12 |
| 2012/0150948 A1* | 6/2012 | Ban | G06F 17/30029 709/203 |
| 2013/0165151 A1* | 6/2013 | Gits | H04W 4/023 455/456.3 |
| 2014/0075385 A1* | 3/2014 | Wan | G06Q 10/1093 715/812 |
| 2015/0128194 A1* | 5/2015 | Kuang | H04N 21/41407 725/81 |
| 2015/0195692 A1* | 7/2015 | Chow | H04M 19/04 455/414.1 |
| 2015/0215734 A1* | 7/2015 | Colangelo | H04W 4/02 455/456.3 |
| 2016/0055360 A1* | 2/2016 | Haugarth | G06Q 30/0201 340/10.1 |
| 2016/0286361 A1* | 9/2016 | Ciecko | H04W 4/028 |

* cited by examiner

*Primary Examiner* — Fan S Tsang
*Assistant Examiner* — David Siegel
(74) *Attorney, Agent, or Firm* — Haynes and Boone, LLP

(57) ABSTRACT

Methods and systems for playing personalized music are described. The methods and systems can automatically play music based on the musical preferences of a user in a vicinity of a music player. The preferences of the user are received or retrieved, and the music played is tailored to the user's preferences. The methods and systems select songs that match or are similar to a musical preference of a user, such as songs in the same genre, style, or by the same artist.

21 Claims, 4 Drawing Sheets

PERSONAL MUSIC PLAYER

BACKGROUND

Field of the Invention

The present invention generally relates to the playing of music based on the preferences of a user.

Related Art

Retail stores frequently play music that accommodate the tastes of a mass audience. Thus, stores do not always play the songs that a listener wants to hear. Studies show that people tend to purchase more from a store when they hear music that they like playing. Therefore, it would be beneficial to personalize the music that a person hears in a store.

Figure 1:
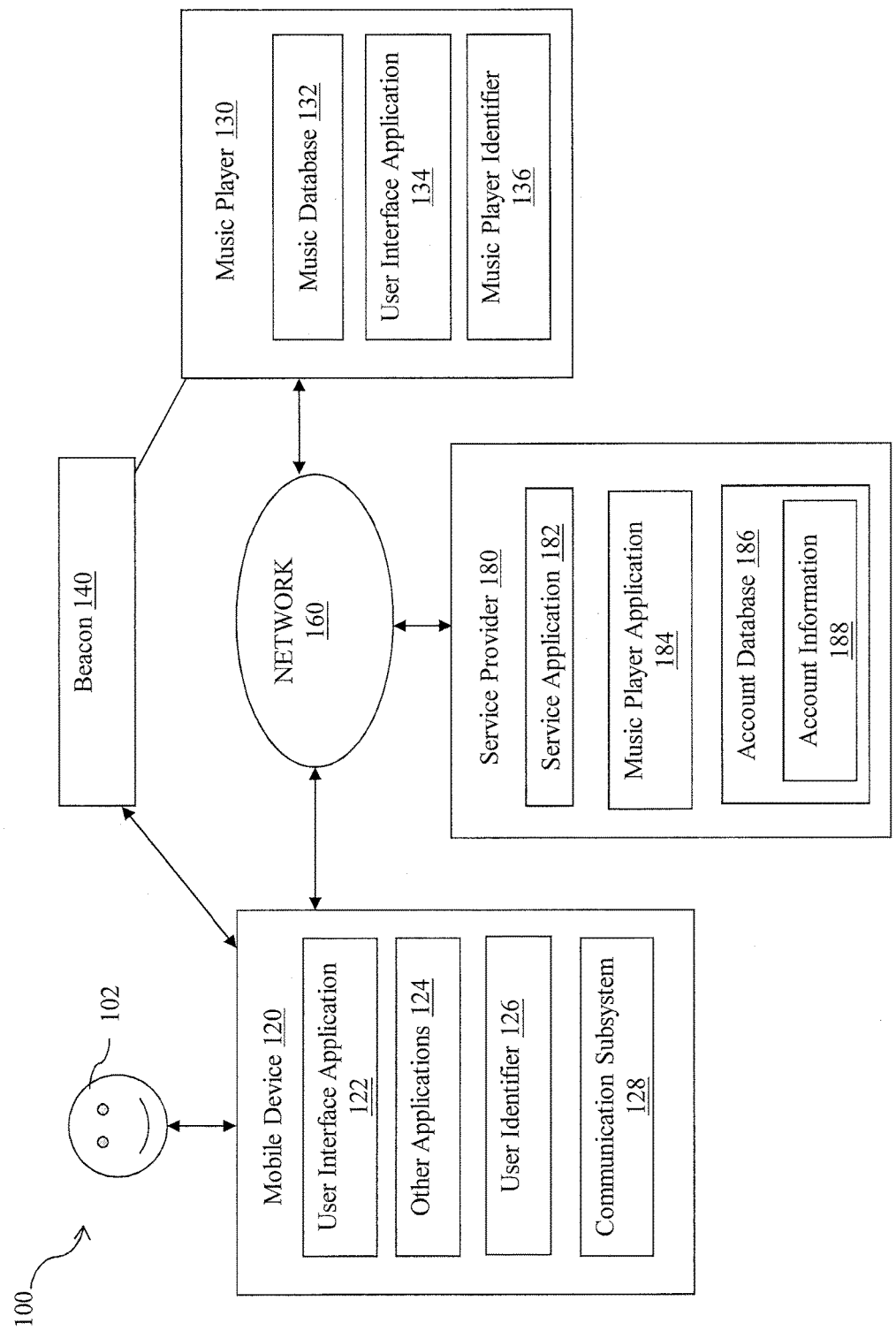
FIG. 1 is a block diagram illustrating a system for playing personalized music according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure describes systems and methods that can automatically play music based on the musical preferences of a user in the vicinity of a music player. As used herein, "music player" can be any device that plays or outputs music, including a speaker or speaker system. The preferences of the user are received or retrieved, and the system is able to tailor the music played for the user based on the user's preferences. A user can provide his or her musical preferences (e.g., favorite artist, group, genre, era, etc.) in the form of a playlist to the system, and the system can associate these musical preferences with the specific user. The system attempts to select songs that match or are similar to a musical preference of a user, such as songs in the same genre, style, or by the same artist.

In various embodiments, music players are distributed throughout a store or other location, and each music player plays a personalized song for a person nearby. For example, several shoppers may walk into an Apple® store. A first shopper comes in proximity of an iPhone®, and a second shopper stops to examine an iPad®. The iPhone® plays a song that the first shopper likes, and the iPad® plays a song that the second shopper likes. In this way, shoppers at a single store or location are able to hear songs that they enjoy, rather than songs that are merely the most popular.

FIG. 1 shows one embodiment of a block diagram of a network-based system 100 adapted to play personalized music for a user, such as user 102. As shown, system 100 may comprise or implement a plurality of servers and/or software components that operate to perform various methodologies in accordance with the described embodiments. Exemplary servers may include, for example, stand-alone and enterprise-class servers operating a server OS such as a MICROSOFT® OS, a UNIX® OS, a LINUX® OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

As shown in FIG. 1, the system 100 includes a mobile device 120 (e.g., a smartphone), one or more music players 130, one or more beacons 140 (e.g., a radio frequency beacon or Bluetooth Low Energy (BLE) beacon) and at least one service provider server or device 180 (e.g., network server device). The mobile device 120, music player 130, and service provider server 180 are in communication over the network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet. The mobile device 120 can communicate to the beacon 140 through Bluetooth low energy or other radio frequencies. The beacon 140, in one embodiment, is physically attached to the music player 130. For example, the beacon 140 may be incorporated into headphones, and the headphones plugged into the music player 130.

The mobile device 120, in one embodiment, may be utilized by the user 102 to interact with the service provider server 180 over the network 160. For example, user 102 may conduct financial transactions (e.g., account transfers) with the service provider server 180 via the mobile device 120. The user 102 may also use the mobile device 120 to communicate song preferences to the service provider server 180.

The mobile device 120 is configured to perform one or more tasks when mobile device 120 is located in proximity to the beacon 140. The task to be performed can include, for example, launching an application program, setting certain files to non-accessible mode, initiating a phone call, sounding an alarm, storing a message, displaying a message, etc.

The mobile device 120, in various embodiments, may be implemented using any appropriate combination of hardware and/or software configured for wired and/or wireless communication over the network 160. The mobile device 120, in one embodiment, may be utilized by the user 102 to interact with the service provider server 180 over the network 160. For example, the user 102 may provide music playlists or preferences to the service provider server 180 via the mobile device 120. In various implementations, the mobile device 120 may include a wireless telephone (e.g., cellular or mobile phone), a tablet, a wearable computing device, a personal computer, a notebook computer, and/or various other generally known types of wired and/or wireless computing devices.

The mobile device 120, in one embodiment, includes a user interface application 122, which may be utilized by the user 102 to conduct transactions (e.g., shopping, purchasing, bidding, etc.) with the service provider server 180 over the network 160. In one aspect, purchase expenses may be directly and/or automatically debited from an account related to the user 102 via the user interface application 122.

In one implementation, the user interface application 122 comprises a software program, such as a graphical user interface (GUI), executable by a processor that is configured to interface and communicate with the service provider server 180 via the network 160. In another implementation, the user interface application 122 comprises a browser module that provides a network interface to browse information available over the network 160. For example, the user interface application 122 may be implemented, in part, as a web browser to view information available over the network 160.

In an example, the user 102 is able to purchase music from a merchant associated with the music player 130 via the service provider server 180. Accordingly, in one or more embodiments, the user 102 may conduct transactions (e.g., purchase and provide payment for one or more songs) with a merchant via the service provider server 180.

The mobile device 120, in various embodiments, may include other applications 124 as may be desired in one or more embodiments of the present disclosure to provide additional features available to user 102. In one example, such other applications 124 may include security applications for implementing client-side security features, calendar application, contacts application, location-based services application, programmatic client applications for interfacing with appropriate application programming interfaces (APIs) over the network 160, and/or various other types of generally known programs and/or software applications. In still other examples, the other applications 124 may interface with the user interface application 122 for improved efficiency and convenience.

In various implementations, a user profile may be created using data and information obtained from cell phone activity over the network 160. Cell phone activity transactions may be used by the service provider server 180 to create at least one user profile for the user 102 based on activity from the mobile device 120 (e.g., cell phone). The user profile may be updated with each financial and/or information transaction (e.g., payment transaction, purchase transaction, etc.) achieved through use of the mobile device 120. In various aspects, this may include the type of transaction and/or the location information from the mobile device 120. As such, the profile may be used for recognizing patterns of potential fraud, setting transaction limits on the user, etc.

The mobile device 120, in one embodiment, may include at least one user identifier 126, which may be implemented, for example, as operating system registry entries, cookies associated with the user interface application 122, identifiers associated with hardware of the mobile device 120, or various other appropriate identifiers. The user identifier 126 may include one or more attributes related to the user 102, such as personal information related to the user 102 (e.g., one or more user names, passwords, photograph images, biometric IDs, addresses, phone numbers, etc.) and banking information and/or funding sources (e.g., one or more banking institutions, credit card issuers, user account numbers, security data and information, etc.). In various implementations, the user identifier 126 may be passed with a user login request to the service provider server 180 via the network 160, and the user identifier 126 may be used by the service provider server 180 to associate the user 102 with a particular user account maintained by the service provider server 180. In various embodiments, the user identifier 126 is associated with the musical preferences of the user 102.

In some embodiments, the mobile device 120 includes a communication subsystem 128, which can include radio frequency receivers and transmitters and/or optical (e.g., infrared) receivers and transmitters. The specific design and implementation of the communication subsystem 128 can depend on the communication network over which the mobile device 120 is intended to operate. For example, the mobile device 120 can include communication subsystems designed to operate over a Global System for Mobile Communication (GSM) network, a General Packet Radio Service (GPRS) network, an Enhanced Data Rates for Global Evolution (EDGE) network, a Wi-Fi or WiMax network, and a Bluetooth™ network.

In an exemplary embodiment, the mobile device 120 includes a library containing music purchased by the user 102. The library, in various embodiments, may be accessed by the service provider server 180 to determine musical preferences of the user 102.

One or more music players 130 may be generally located in a bar, restaurant, club, or other desired location, such as a store, an office, a house, or even an area (e.g., containing a booth or exhibit within a field or convention center), and is operable to play or deliver music to a user. In various implementations, the one or more music players 130 may include an iPhone®, iPod®, iPad®, Blackberry®, MP3/MP4 player, and/or various other generally known types of digital media players.

The one or more music players 130, in various embodiments, may be maintained by one or more business entities (or in some cases, by a partner of a business entity that processes transactions on behalf of business entities). Examples of businesses entities include retail stores, merchant sites, resource information sites, utility sites, real estate management sites, social networking sites, etc.

In some embodiments, the music player 130 includes a music database 132 for identifying music for sale or play, which may be made available for viewing and purchase or listening by the user 102. In one or more embodiments, user 102 may complete a transaction such as purchasing the music via service provider server 180.

The music database 132, in various embodiments, contains a library of audio content and audiovisual content (typically music and associated video or graphics). In one embodiment, the music database 132 is periodically updated with new or popular songs. The updating may occur remotely, or it may be updated manually by, for example, an operator using an update tool provided by the entity controlling the music player 130.

The music player 130, in one embodiment, also includes a user interface application 134. In some embodiments, the music player 130 may receive, store, and/or display a graphical user interface (GUI). The GUI may display a listing of the music tracks that are stored in the music database 132 and available for playback. Additionally, the GUI may provide a screen or portion of a screen that displays the currently playing music track.

The music player 130, in one embodiment, may include at least one music player identifier 136, which may be implemented, for example, as operating system registry entries, cookies associated with the user interface application 134, identifiers associated with hardware of the music player 130, or various other appropriate identifiers. The music player identifier 136 may include one or more attributes related to the music player 130, such as location of the music player 130 and songs available on the music player 130. The music player identifier 136 may also include one or more attributes and/or parameters related to the merchant controlling the music player 130, such as business and banking information.

Beacon 140 may be set up by merchants or individuals offering various items, such as products and/or services for sale. As defined herein, a "beacon" is a short range communication device having a known or fixed location that provides a signal that can be detected by mobile devices within a certain proximity of the beacon. In various embodiments, the beacon 140 includes a beacon identifier, which identifies the specific location of the beacon (e.g., what merchant store the beacon is located in and where exactly in the merchant store the beacon is located). An example of a beacon is a radio frequency (RF) beacon (e.g., Bluetooth™ low energy (BLE) beacon), infrared beacon or a radio frequency identifier (RFID) tag. For example, a BLE beacon can broadcast an RF signal that includes its position coordinates (e.g., latitude, longitude), which can be detected by a mobile device. In some implementations, the beacon can also advertise location based services provided by a beacon network. A beacon network encompasses a plurality of beacons in a geographic region.

Beacon 140 is typically maintained by one or more service providers. When user 102 comes in range of beacon 140, a mobile application on the mobile device 120 run by a service provider can wake up and connect to the beacon 140. Mobile device 120 can then receive messages from beacon 140 and communicate with beacon 140. In some implementations, beacon 140 is a BLE beacon.

Beacon 140 can output a wireless signal that can be detected by mobile device 120 when mobile device 120 is within a certain proximity of the beacon 140. Beacon 140 may be a device that periodically or continuously transmits a signal, such as a short-distance wireless (e.g., BLE), medium distance wireless (e.g., Wi-Fi), and/or other electro, magnetic, and/or electro-magnetic transmissions. Power on beacon 140 can be adjusted to communicate only within a desired range, which may depend on intended message ranges. Mobile device 120 is configured to detect the transmitted signals from beacon 140, such that when mobile device 120 is located within the transmission range of beacon 140, the signal may be detected.

The service provider server 180, in one embodiment, may be maintained by a transaction processing entity, which may provide processing for financial transactions and/or information transactions for the user 102. As such, the service provider server 180 includes a service application 182, which may be adapted to interact with the mobile device 120 and/or music player 130 over the network 160. In one example, the service provider server 180 may be provided by PayPal®, Inc., eBay® of San Jose, Calif., USA, and/or one or more financial institutions or a respective intermediary that may provide multiple point of sale devices at various locations to facilitate transaction routings between merchants and, for example, financial institutions.

The service provider server 180, in one embodiment, may be configured to maintain one or more user accounts and merchant accounts in an account database 186 each of which may include account information 188 associated with one or more individual users (e.g., user 102) and merchants. For example, account information 188 may include private financial information of user 102, such as one or more account numbers, passwords, credit card information, banking information, or other types of financial information, which may be used to facilitate financial transactions between user 102 and a merchant. In various aspects, the methods and systems described herein may be modified to accommodate users and/or merchants that may or may not be associated with at least one existing user account and/or merchant account, respectively.

In one implementation, the user 102 may have identity attributes stored with the service provider server 180, and user 102 may have credentials to authenticate or verify identity with the service provider server 180. User attributes may include personal information, banking information and/or funding sources. In various aspects, the user attributes may be passed to the service provider server 180 as part of a login, search, selection, purchase, and/or payment request, and the user attributes may be utilized by the service provider server 180 to associate user 102 with one or more particular user accounts maintained by the service provider server 180.

In various embodiments, service provider server 180 includes a music player application 184. The music player application 184 can provide personalized music to the user 102, recommend music likely to be appealing to user 102, and bill user 102 for music purchases. In some embodiments, the music player application 184 collects and stores musical preferences of the user 102. For example, the music player application 184 may build up or compile a list of the user 102's preferred songs, such as by reviewing songs previously purchased by the user 102. Specifically, the music player application 184 can determine user preferences based on the user 102's selection of one or more tracks from a particular category, a particular artist, a particular album, a particular time period (e.g., the 80's), and/or a particular genre. The music player application 184 can also analyze the music stored on the mobile device 120. From that information, the music player application 184 can determine what kind of music the user 102 enjoys listening to.

Figure 2:
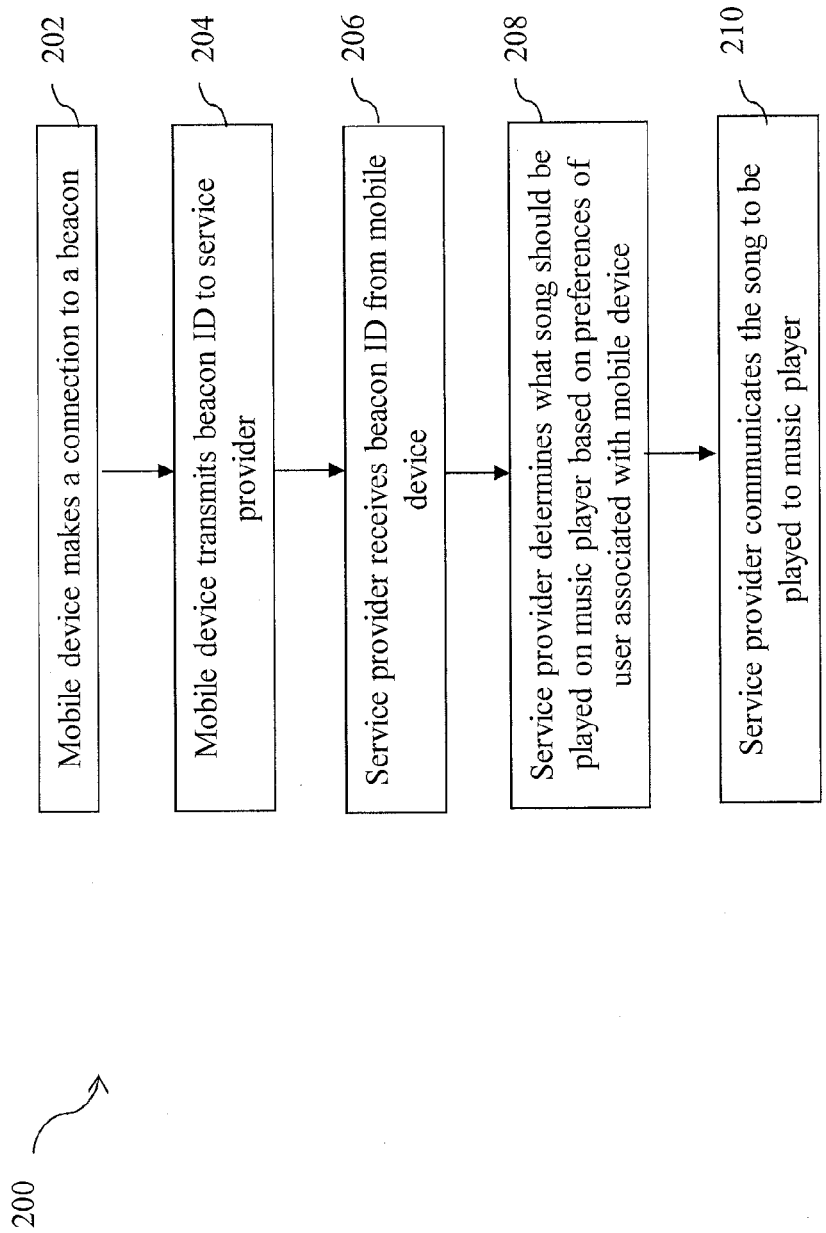
FIG. 2 is a flowchart showing a method for playing personalized music according to an embodiment of the present disclosure.

Referring now to FIG. 2, a flowchart 200 of a method for playing personalized music is illustrated according to an embodiment of the present disclosure. In various embodiments, the user 102 registers with a service provider, which runs a mobile application. Registration may include signing up for the service and agreeing to any terms required by the service provider, such as through a user device. In one embodiment, the user device is a mobile computing device, such as a smartphone, a PC, or a computing tablet. In other embodiments, registration may be done completely through the user device, partially through the user device, or without using the user device, such as through a phone call or in-person visit to a representative of the payment service provider.

The user may be requested to provider specific information for registration, such as, but not limited to, a name, address, phone number, email address, picture, a user name for the account, and a password or PIN for the account. The type of information may depend on whether the user already has an account with the service provider. Requested information may be entered through the user device or other means, including voice or manual key entry. Once all the requested information is received and confirmed, the service provider may create an account for the user.

In various embodiments, the user 102 may provide musical preferences, e.g., favorite artists, albums, songs, genres, themes, mood, etc. to the service provider. For example, the user 102 can manually enter musical preference information or select options from drop-down menus. In another example, the user 102 links an external data source such as Spotify, Pandora, Last.fm, etc. to provide his or her musical preferences. In various aspects, the user 102's musical preferences are associated with a user ID. In some embodiments, the user 102 can also specify the kind of music he or she does not enjoy or does not want to hear.

In another embodiment, the musical preferences are determined by the service provider server 180, without any input from the user 102. The service provider server 180 can access the music library on the mobile device 120, analyze the music stored in the library, and determine what kinds of songs or artists the user 102 prefers to listen to. The service provider can also use past purchases and/or searches of music, concert tickets, and festivals, as well as information from social networks, such as events the user 102 has attended or music the user 102 likes.

When user 102 enters the vicinity of beacon 140 in a store, at step 202, mobile device 120, which can be a phone, computing tablet, wearable computing device (such as glasses or watch), or other suitable mobile computing device, makes a connection with beacon 140. In some embodiments, several beacons (including beacon 140) are scattered throughout a store, with each beacon close to a music player 130. In some embodiments, each beacon is associated with one music player. These beacons send signals out to the mobile device 120. The beacon 140 senses the user 102's presence by way of electronic communication with mobile device 120. As such, user 102's specific location can be determined using beacon 140.

The mobile device 120 identifies the beacon 140 because of the beacon signals received. In one aspect, the beacon signals transmitted to the mobile device 120 include a beacon ID. The beacon ID identifies, for example, the retail store or location where the beacon 140 is placed and its exact location in the retail store. At step 204, mobile device 120 transmits the beacon ID to the service provider server 180.

At step 206, the service provider server 180 receives the beacon ID. The service provider server 180 now knows where the user 102 is located (e.g., which store and what location in the store) because the beacon ID identifies the specific location of the beacon 140 and user 102.

Once the location of the user 102 is determined, the service provider determines which music player 130 is closest to the user 102. At step 208, the service provider server 180 determines what song should be played on the closest music player 130 based on the user 102's preferences. In some embodiments, the mobile device 120 transmits the user 102's musical preferences (e.g., music playlist) to the service provider server 180. In other embodiments, the service provider server 180 already knows the musical preferences of the user 102 and retrieves these preferences. The service provider server 180 can also receive updated musical preferences (e.g., new songs) from the mobile device 120. These updated musical preferences may be used by the service provider to determine what song the user 102 would like to hear.

The service provider server 180 takes the musical preferences of the user 102 and makes a decision about what song should be played on the music player 130. In various embodiments, the service provider compares the musical preferences to the music available on the music player. For example, if the musical preferences of the user 102 include the songs "Yesterday" by The Beatles, "Respect" by Aretha Franklin, "Thriller" by Michael Jackson, and "Love Somebody" by Maroon 5, and the music player 130 can play "Respect," then the service provider will instruct the music player 130 to play "Respect." In another example, the music player 130 does not include any of these songs, and the service provider must determine what the user 102 would like to hear from the songs available on the music player 130. If the music player 130 includes other songs by Maroon 5, such as "She Will Be Loved" or "Daylight," the service provider server 180 may recommend that one of those songs be played.

Recommendations can also be based on various factors, such as the time of day, time of year, a user's calendar, current weather, a user's location, etc., to provide a more educated recommendation as to what the user 102 may most like to hear at that time and location. For example, the user 102 may typically enjoy softer music in the morning and evening hours and more energetic music mid-day, patriotic songs may be recommended on or near July $4^{th}$ and holiday songs may be recommended around Thanksgiving and Christmas, songs related to an upcoming event on the user's calendar may be recommended, such as a song by a band the user is planning to see later that day or in the near future, tropical songs may be recommended during a snowy, rainy, or cold day, Hawaiian music may be recommended if the user 102 is determined to be in Hawaii, such as for vacation, etc. Thus, even knowing music the user 102 may enjoy, a more specific recommendation may be provided using additional information. In other embodiments, recommendations take into consideration recent recommendations, such that the same songs are not repeatedly recommended over a short period of time. For example, if song A is recommended, and then the user 102 is detected as leaving the beacon area, song A will not be recommended again if the user 102 returns to the beacon area or a beacon area associated with a music player 130 at another location later that day (or some other recent time interval).

In some embodiments, the service provider server 180 ranks the song preferences of the user 102. The songs may be ranked according to the factors described above (e.g., time of day, time of year, location, weather, calendar appointments, location, etc.). For example, the service provider server 180 may rank song A higher than song B because song A is more suited for the weather or location. The service provider server 180 then determines what songs are present on music player 130. The service provider discovers that music player 130 does not have song A, but does have song B. The service provider server 180 has access to or knowledge of the songs that are available on music player 130. The service provider server 180 instructs music player 130 to play song B.

At step 210, the service provider server 180 communicates the song to be played to the music player 130. Once the music player 130 receives the song information, the music player 130 accesses its music database 130, retrieves the song, and plays the song for the user 102. In various embodiments, the volume of the music player 130 is adjusted so that the user 102 can hear the song, but other users in the store or location cannot. A pair of headphones or earphones may be available near the music player 130 so that the user 102 can listen to the song at a higher volume without disturbing others in the store.

Figure 3:
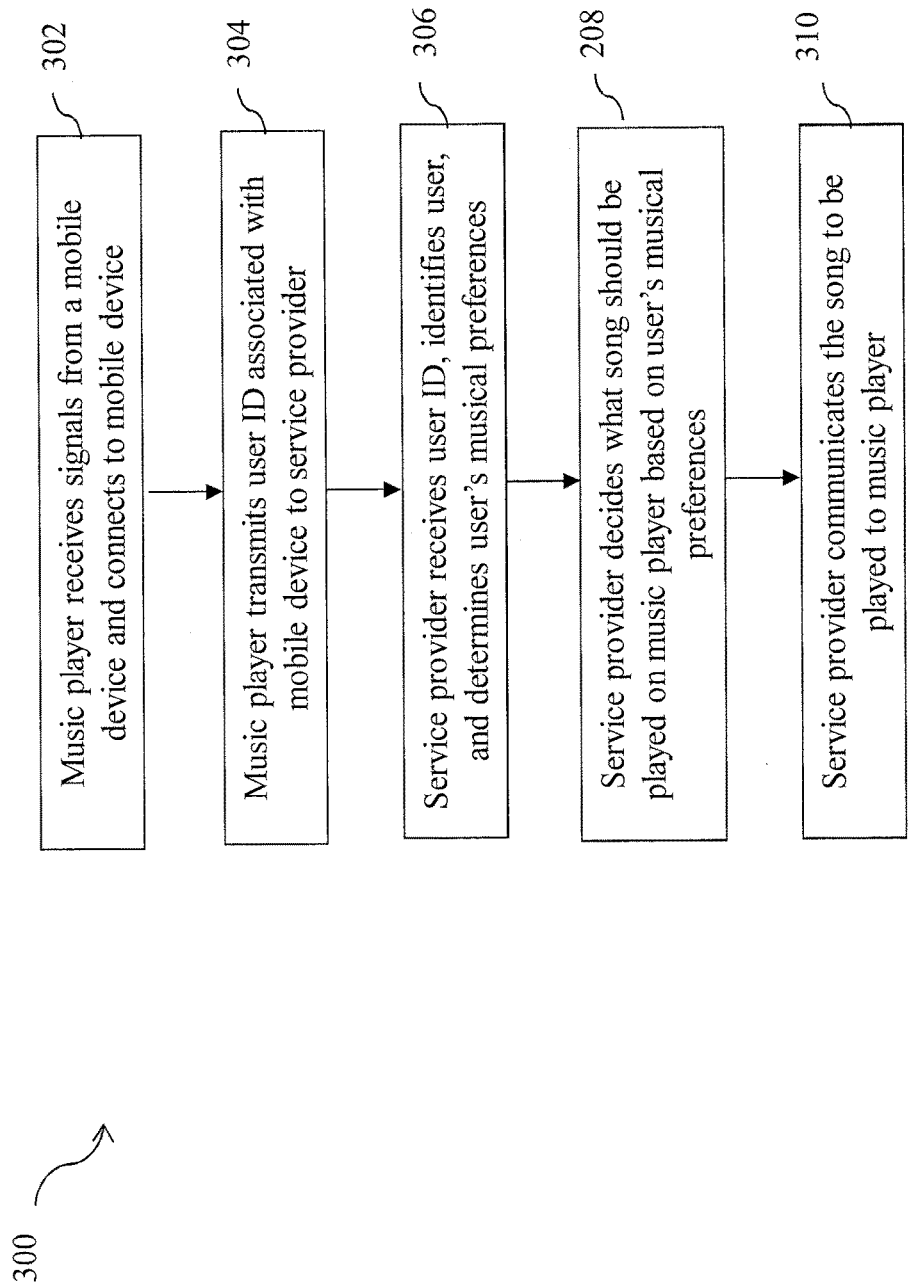
FIG. 3 is a flowchart showing another method for playing personalized music according to an embodiment of the present disclosure.

Referring now to FIG. 3, a flowchart 300 of another method for playing personalized music is illustrated according to an embodiment of the present disclosure. The user 102 enters a store or location, and a beacon in the mobile device 120 sends out signals to music players 130 in the store. Any device that is equipped with Bluetooth LE technology (e.g., iPhone®) can function as a beacon. In various embodiments, the signals include the user ID of the user 102.

At step 302, one of the music players 130 (e.g., the music player closest to the mobile device 120) in the store receives the signals from the beacon in the mobile device 120 and connects to mobile device 120. In some embodiments, the signals include the user ID associated with the mobile device 120. At step 304, the music player 130 transmits the user ID to the service provider server 180. At step 306, the service provider server 180 receives the user ID of the user 102, identifies the user 102, and determines the user 102's musical preferences. In embodiments where the musical preferences were not previously stored, the service provider server 180 can request song preferences from the mobile device 120, and the mobile device 120 can transmit the song preferences to the service provider server 180.

At step 308, the service provider server 180 makes a decision about what song should be played on the music player 130 based on the preferences. This can be done according to the methods described with respect to step 208.

At step 310, the service provider communicates the song to the music player 130, and the music player 130 retrieves the song from its music database and plays it for the user 102.

The present disclosure describes systems and methods that provide a personalized music experience to a plurality of users at a location. The music played for a user is based on the unique music preferences of that user, rather than on the shared musical preferences of a group of users. The system examines the personal musical preferences of each individual user and decides what song to play for that user. Advantageously, the music that plays is tailored for specific users, and personalizes their listening experience.

Figure 4:
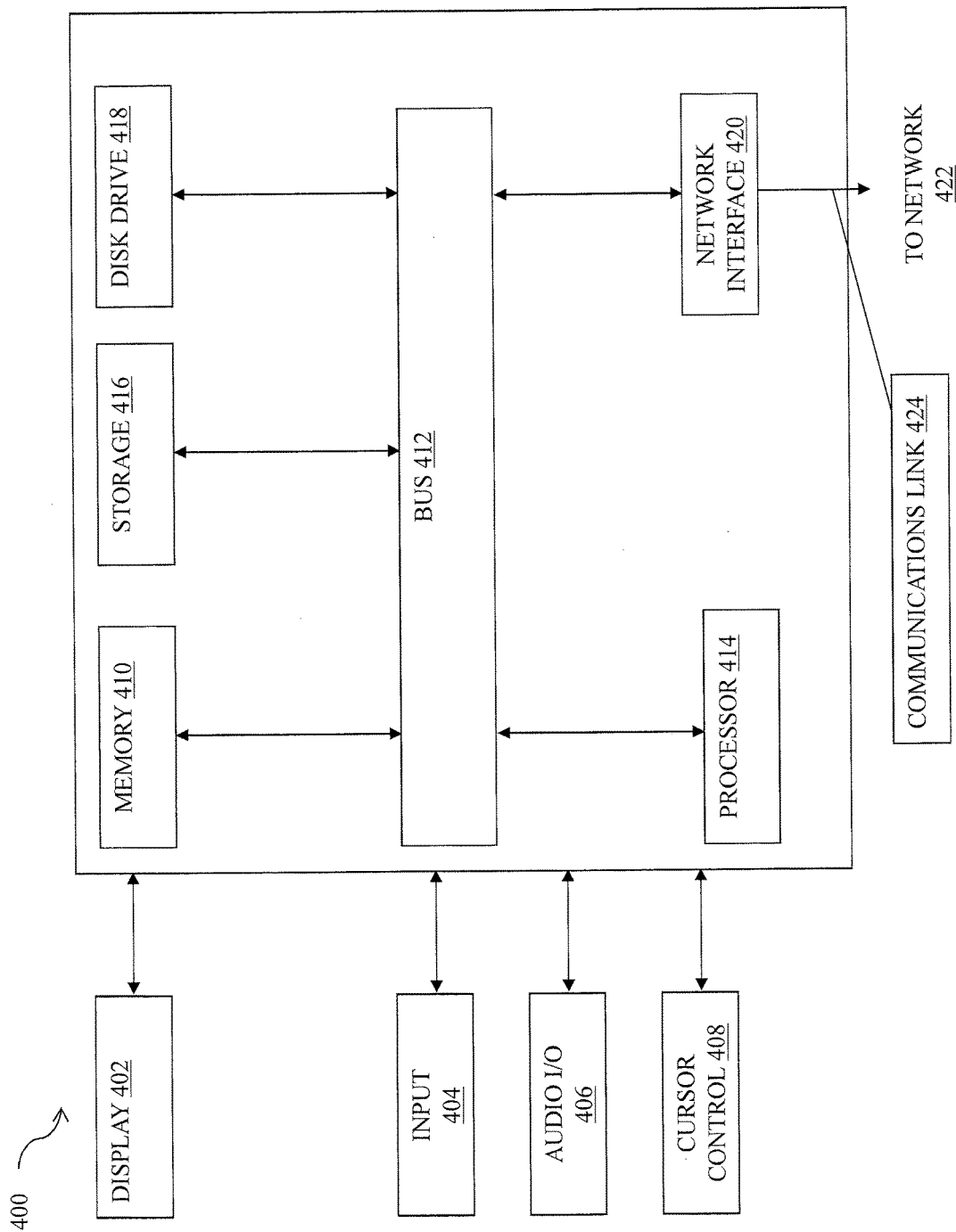
FIG. 4 is a block diagram of a system for implementing a device according to an embodiment of the present disclosure.

FIG. 4 is a block diagram of a computer system 400 suitable for implementing one or more embodiments of the present disclosure, including the mobile device 120, the music player 130, beacon 140, and the service provider server 180. In various implementations, the mobile device 120, the music player 130, and beacon 140 may comprise a mobile cellular phone, personal computer (PC), laptop, wearable computing device, etc. adapted for wireless communication, and the service provider server 180 may comprise a network computing device, such as a server. Thus, it should be appreciated that the devices 120, 130, 140, and 180 may be implemented as computer system 400 in a manner as follows.

Computer system 400 includes a bus 412 or other communication mechanism for communicating information data, signals, and information between various components of computer system 400. Components include an input/output (I/O) component 404 that processes a user (i.e., sender, recipient, service provider) action, such as selecting keys from a keypad/keyboard, selecting one or more buttons or links, etc., and sends a corresponding signal to bus 412. I/O component 404 may also include an output component, such as a display 402 and a cursor control 408 (such as a keyboard, keypad, mouse, etc.). An optional audio input/output component 406 may also be included to allow a user to use voice for inputting information by converting audio signals. Audio I/O component 406 may allow the user to hear audio. A transceiver or network interface 420 transmits and receives signals between computer system 400 and other devices, such as another user device, a merchant server, or a service provider server via network 422. In one embodiment, the transmission is wireless, although other transmission mediums and methods may also be suitable. A processor 414, which can be a micro-controller, digital signal processor (DSP), or other processing component, processes these various signals, such as for display on computer system 400 or transmission to other devices via a communication link 424. Processor 414 may also control transmission of information, such as cookies or IP addresses, to other devices.

Components of computer system 400 also include a system memory component 410 (e.g., RAM), a static storage component 416 (e.g., ROM), and/or a disk drive 418. Computer system 400 performs specific operations by processor 414 and other components by executing one or more sequences of instructions contained in system memory component 410. Logic may be encoded in a computer readable medium, which may refer to any medium that participates in providing instructions to processor 414 for execution. Such a medium may take many forms, including but not limited to, non-volatile media, volatile media, and transmission media. In various implementations, non-volatile media includes optical or magnetic disks, volatile media includes dynamic memory, such as system memory component 410, and transmission media includes coaxial cables, copper wire, and fiber optics, including wires that comprise bus 412. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 424 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A content delivery system, comprising:
   one or more beacons each configured to detect and communicate with one or more mobile devices at least in part by transmitting a respective beacon identifier (ID) to the one or more mobile devices, wherein each beacon TD identifies a facility and a location within the facility in which the beacon transmitting the beacon ID is placed;
   a database storing audio or visual content; and
   a plurality of content delivery devices registered to be at the location such that each of the content delivery devices is configured to play the audio or visual content;
   wherein the content delivery system is configured to perform operations comprising:
      receiving, from a particular mobile device of the one or more mobile devices, a particular beacon ID;
      identifying, based on the received particular beacon ID, a user of the particular mobile device and a particular content delivery device of said devices that is located closest to the user;
      based on the identifying, determining content preferences of the user;
      selecting, based on the determined content preferences, content from the database; and
      causing the particular content delivery device to play the selected content.

2. The content delivery system of claim 1, wherein the audio or visual content stored in the database includes music that can he purchased, and wherein the content delivery system further comprises a music application that can be installed on the one or more mobile devices and that bills users of the one or more mobile devices for music purchases made through the database.

3. The content delivery system of claim 1, wherein the database stores a play history for the user.

4. The content delivery system of claim 1, wherein the content delivery devices are each further configured to display the visual content or output the audio content.

5. The content delivery system of claim 1, wherein the determining the content preferences further comprises analyzing existing content stored on the one or more mobile devices.

6. The content delivery system of claim 1, wherein at least some of the audio or visual content is stored on the plurality of content delivery devices.

7. The content delivery system of claim 6, wherein the content delivery devices each include a respective identifier that identifies:
   a position of the content delivery device associated with the identifier; and
   the at least some of the audio or visual content stored on the content delivery device.

8. A method, comprising:
   transmitting, via one or more beacons, one or more beacon identifiers (IDs) to one or more mobile devices, wherein each of the one or more beacon IDs identifies a facility and a location within the facility in which the beacon transmitting the beacon ID is placed, wherein a plurality of content delivery devices are registered for the location within the facility such that each of the content delivery devices is configured to play audio or visual content;
   receiving, from a first mobile device of the one or more mobile devices, a first beacon ID;
   identifying, based on the first beacon ID, a user of the first mobile device and a first content delivery device of the plurality of content delivery devices that is located closest to the user;
   based on the identifying, determining a user preference corresponding to an account associated with the first mobile device;
   selecting, based on the user preference, audio or visual content from a database; and
   causing the first content delivery device to play the selected content.

9. The method of claim 8, wherein the audio or visual content from the database includes music that can be purchased, and wherein the method further comprises billing, using a music application, the user for music purchases made through the database.

10. The method of claim 8, further comprising accessing a play history for the user in the database.

11. The method of claim 8, wherein the causing comprises causing the first content delivery device to display the visual content or play the audio content.

12. The method of claim 8, wherein the determining the user preference further comprises analyzing existing content stored on the one or more mobile devices.

13. The method of claim 8, wherein the database includes the plurality of content delivery devices, and wherein at least some of the audio or visual content is stored on the plurality of content delivery devices.

14. The method of claim 13, further comprising: determining, via an identifier of one of the content delivery devices:
   a position of the content delivery device associated with the identifier; and
   the at least some of the audio or visual content stored on the content delivery device.

15. A non-transitory machine-readable computer medium having stored thereon machine-readable instructions executable to cause a machine to perform operations comprising:
   transmitting, via one or more beacons, one or more beacon identifiers (IDs) to one or more mobile devices, wherein each of the one or more beacon IDs identifies a facility and a location within the facility in which the beacon transmitting the beacon ID is placed, wherein a plurality of content delivery devices are registered for the location within the facility such that each of the content delivery devices is configured to play audio or visual content;
   receiving, from a first mobile device of the one or more mobile devices, a first beacon ID;
   identifying, based on the first beacon ID, a user of the first mobile device and a first content delivery device of the plurality of content delivery devices that is located closest to the user;
   based on the identifying, determining a user preference corresponding to an account associated with the first mobile device;
   selecting, based on the user preference, audio or visual content from a database; and causing the first content delivery device to play the selected content.

16. The non-transitory machine-readable computer medium of claim 15, wherein the audio or visual content from the database includes music that can be purchased, and wherein the operations further comprise billing, using a music application, the user for music purchases made through the database.

17. The non-transitory machine-readable computer medium of claim 15, wherein the operations further comprise accessing a play history for the user in the database.

18. The non-transitory machine-readable computer medium of claim 15, wherein the causing comprises causing the first content delivery device to display the visual content or play the audio content.

19. The non-transitory machine-readable computer medium of claim 15, wherein the determining the user preference further comprises analyzing existing content stored on the one or more mobile devices.

20. The non-transitory machine-readable computer medium of claim 15, wherein the database includes the plurality of content delivery devices, and wherein at least some of the audio or visual content is stored on the plurality of content delivery devices.

21. The non-transitory machine-readable computer medium of claim 20, wherein the operations further comprise determining, via an identifier of one of the content delivery devices:
   a position of the content delivery device associated with the identifier; and
   the at least some of the audio or visual content stored on the content delivery device.

* * * * *